United States Patent
Chmiola et al.

(10) Patent No.: US 12,537,220 B2
(45) Date of Patent: Jan. 27, 2026

(54) SYSTEMS AND METHODS FOR ENGINEERING A COATING MATERIAL DECORATED ON A CONDUCTIVE CARBON SURFACE

(71) Applicant: NantG Power, LLC, El Segundo, CA (US)

(72) Inventors: John Chmiola, El Segundo, CA (US); Taylor Juran, El Segundo, CA (US); Fabio Albano, El Segundo, CA (US); Patrick Soon-Shiong, El Segundo, CA (US)

(73) Assignee: NantG Power, LLC, El Segundo, CA (US)

( * ) Notice: Subject to any disclaimer, the term of this patent is extended or adjusted under 35 U.S.C. 154(b) by 0 days.

(21) Appl. No.: 18/754,041

(22) Filed: Jun. 25, 2024

(65) Prior Publication Data

US 2024/0429434 A1 Dec. 26, 2024

Related U.S. Application Data

(60) Provisional application No. 63/510,216, filed on Jun. 26, 2023.

(51) Int. Cl.
| | |
|---|---|
| *H01M 10/052* | (2010.01) |
| *C09C 1/44* | (2006.01) |
| *H01M 4/62* | (2006.01) |
| *C09C 1/48* | (2006.01) |
| *C09C 3/06* | (2006.01) |
| *H01M 4/02* | (2006.01) |

(52) U.S. Cl.
CPC ............. *H01M 10/052* (2013.01); *C09C 1/44* (2013.01); *H01M 4/625* (2013.01); *C01P 2004/80* (2013.01); *C01P 2006/12* (2013.01); *C01P 2006/40* (2013.01); *C09C 1/48* (2013.01); *C09C 3/063* (2013.01); *H01M 2004/028* (2013.01)

(58) Field of Classification Search
CPC ..................................... C09C 1/44; C09C 1/48
See application file for complete search history.

(56) References Cited

U.S. PATENT DOCUMENTS

2016/0133394 A1* 5/2016 Sakshaug ............... H01G 11/50
361/502
2016/0351943 A1* 12/2016 Albano ................. H01M 4/628

FOREIGN PATENT DOCUMENTS

CN 103199299 A * 7/2013 ........ H01M 10/0525

OTHER PUBLICATIONS

Woochul ShinN et al., "Fluorinated Co-solvent Promises Li-S Batteries Under Lean Electrolyte Conditions," Department of Chemistry, Oregon State University, Corvallis, Hewlett-Packard Co., Chemical Sciences and Engineering Division, Argonne National Laboratory, Lemont, Illinois, pp. 1-26.

Won-Gwang Lim et al. "A Comprehensive Review of Materials with Catalytic Effects in Li-S Batteries—Enhanced Redox Kinetics," A Journal of the Gesellschaft Deutscher Chemiker, Angewandet Chemie, International Edition, www.angewandte.org, pp. 1-14.

Lele Peng et al., "A fundamental look at electrocatalytic sulfur reduction reaction," Nature Catalysis, www.nature.com/natcatal, pp. 1-9.

L. Nazar et al., "A Graphene-like Metallic Cathode Host For Long-life and High-loading Lithium-Sulfur Batteries," Royal Society of Chemistry, Department of Chemistry and the Waterloo Institute for Nanotechnology, University of Waterloo, Materials Horizons, rsc.li/materials-horizons, pp. 1-17.

Xiao Liang et al., "A highly efficient polysulfide mediator for lithium-sulfur batteries," Nature Communications, Department of Chemistry, University of Waterloo, Received Sep. 23, 2014 | Accepted Oct. 27, 2014 | Macmillan Publishers Jan. 6, 2015, pp. 1-8.

(Continued)

*Primary Examiner* — Khanh T Nguyen

(74) *Attorney, Agent, or Firm* — Finnegan, Henderson, Farabow, Garrett & Dunner LLP

(57) ABSTRACT

Disclosed is an engineered coating material decorated on a conductive carbon, comprising: a coating material disposed on a surface of the conductive carbon with a partial coverage or full coverage, wherein the coating material comprises at least one material selected from a group comprising: $AlO_x$, $TiO_x$, $SnO_x$, $ZnO_x$, $NbO_x$, $TiNb_xO_y$, $AlP_xO_y$, $MgO_x$, $LiNb_xO_y$, $BO_x$, $CeO_x$, $LiAl_xO_y$, $Sn(PO_4)_x$, $ZrO_x$, $MgAl_xO_y$, $SiO_x$, $NiO_x$, Pt, Pd, Ir, $Ru_xO_y$, $CeZr_xO_y$, $BiO_x$, $TiN_x$, ZnO, ZnS, $MnO_2$, $NbO_2$, $VS_2$, $TiS_2$, $CoS_2$, and $Al_2O_3$.

15 Claims, 8 Drawing Sheets

(56) References Cited

OTHER PUBLICATIONS

Karthikeyan Kumaresan et al., "A Mathematical Model for a Lithium-Sulfur Cell," University of South Carolina, Dept of Chemical Engineering, Published in Journal of the Electrochemical Society, vol. 155, Issue 8, 2008, pp. A576-A582.

Bo Yan et al., "A review of atomic layer deposition providing high performance lithium sulfur batteries," Journal of Power Sources 338, 2017, pp. 34-38.

Meng Zhao et al., "A Perspective toward Practical Lithium-Sulfur Batteries," ACS Central Science, 2020, American Chemical Society, pp. 1095-1104; Figures 1-5.

Rachel Carter, U.S. Naval Research Laboratory, In-Situ Investigation of Ambient and Sub-Ambient Sodium-Sulfur Discharge Mechanism in Glyme Ethers, Surface Chemistry Branch, Chemistry Divisional, Mar. 29, 2021.

M. Yu et al., "Atomic layer deposited $TiO_2$ on a nitrogen-doped graphene-sulfur electrode for high performance lithium-sulfur batteries," Energy & Environmental Science, Royal Society of Chemistry, pp. 1-10.

Guangmin Zhou et al., "Catalytic oxidation of $Li_2S$ on the surface of metal sulfides for Li-S batteries," Department of Materials Science and Engineering, Stanford University, Stanford, CA, Jan. 31, 2017, vol. 114, No. 5, pp. 840-845.

Shouzheng Zhang et al., "Comprehensive Design of the High-Sulfur-Loading Li-S Battery Based on MXene Nanosheets," Nano-Micro Letters, Ma 20, 2020, Shanghai Jiao Tong University Press.

Bin Yang et al., "Critical Role of Anion Donicity in $Li_2S$ Deposition and Sulfur Utilization in Li-S Batteries," Applied Materials & Interfaces, 2019 American Chemical Society, www.acsami.org., pp. 25940-25948.

Hianbin Zhou et al., Deciphering the Modulation Essence of p Bands in Co-Based Compounds on Li-S Chemistry, Joule 2, 2681-2693, Dec. 19, 2018, pp. 1-14.

Zhong Su et al., "Defect Engineering in Titanium-Based Oxides for Electrochemical Energy Storage Devices," Electrochemical Energy Reviews, Springer, Feb. 28, 2020, https://doi.org/10.1007/s41918-020-00064-5.

M. Yu et al., "Dual-protection of a graphene-sulfur composite by a compact graphene skin and an atomic layer deposited oxide coating for a lithium-sulfur battery," NANOSCALE, Royal Society of Chemistry, www.rsc.org/nanoscale, pp. 1-6.

Jinlei Qin et al., "Engineering Cooperative Catalysis in Li-S Batteries," Advanced Energy Materials, 2023, www.advenergymat.de, pp. 1-34.

Hong-Jie Peng et al., "Enhanced Electrochemical Kinetics on Conductive Polar Mediators for Lithium-Sulfur Batteries," Angew. Chem. Int. Ed. 2016, 55, Wiley Online Library, pp. 1-6.

Hongyu Pan et al., "$Fe_3C$-N-doped carbon modified separator for high performance lithium-sulfur batteries," Journal of Energy Chemistry, 39, 2019, pp. 101-108.

Notice of Intent No. DE-FOA-0002892, U.S. Dept. of Energy, Office of Energy Efficiency & Renewable Energy, pp. 1-7.

Guochun Yang et al., "Insight into the role of $Li_2S_2$ in Li-S batteries—a first-principles study," Journal of Materials Chemistry A, Royal Society of Chemistry, 2015, J. Mater. Chem, pp. 8865-8869.

Dong Zheng et al., "Investigation of Li-S Battery Mechanism by Real-Time Monitoring the Changes of Sulfur and Polysulfide Species during the Discharge and Charge," Chemistry Department, Brookhaven National Laboratory, U.S. Department of Energy USDOE Office of Science (SC), Basic Energy Sciences (BES) (SC-22), pp. 1-25.

Scott Evers et al., "Understanding the Nature of Absorption/Adsorption in Nanoporous Polysulfide Sorbents for the Li-S Battery," The Journal of Physical Chemistry, 2012_dx.doi.org/10.1021/jp304380j | J. Phys. Chem. C 2012, 116, pp. 19653-19658.

Yingquin Tao et al., "Kinetically-enhanced polysulfide redox reactions by $Nb_2O_5$ nanocrystals for high-rate lithium-sulfur battery," Energy & Environmental Science, Royal Society of Chemistry, 2013, pp. 1-12.

Arumugam Manthiram et al., "Lithium battery chemistries enabled by solid-state electrolytes," Nature Reviews, 2017 Macmillan Publishers Limited, vol. 2, Article No. 16103, pp. 1-6.

M. Wild et al., "Lithium sulfur batteries, a mechanistic review," Energy & Environmental Science, Royal Society of Chemistry, 2015, Energy Environment Sci, 2015, pp. 3477-3494.

Christian Prehal et al., "Mechanism of $Li_2S$ formation and dissolution in Lithium-Sulphur Batteries," Research Square, Aug. 16, 2021, pp. 1-21.

M. Vijayakumar et al., "Molecular structure and stability of dissolved lithium polysulfide species," Royal Society of Chemistry, Phys Chem. Chem Phys, 2016, vol. 16, pp. 10923-10932.

Yuping Liu et al., "Nitrogen Doping Improves the Immobilization and Catalytic Effects of $Co_9S_8$ in Li-S Batteries," Advanced Functional Materials, 2020, www.afm-journal.de, pp. 1-10.

Li-Peng Hou et al., "An encapsulating lithium-polysulfide electrolyte for practical lithium-sulfur batteries," Cell Press, Chem 8, Apr. 14, 2022, PIIS2451929421006549, pp. 1083-1098.

Yo Chan Jeong et al, "Rational design of nanostructured functional interlayer/separator for advanced Li-S batteries," Advanced Functional Materials, 2018, www.afm-journal.de., pp. 1-32.

Susanne Dorfler et al., "Recent Progress and Emerging Application Areas for Lithium-Sulfur Battery Technology," Progress Report, Energy Technology, 2021, www.entechnol.de, pp. 1-14.

Dan Luo et al., "Revealing the Rapid Electrocatalytic Behavior of Ultrafine Amorphous Defective $Nb_2O_{5-x}$ Nanocluster toward Superior Li-S Performance," ACS NANO, National Univ of Singapore, Mar. 17, 2020, pp. 1-33.

Zhejun Li et al, "Solvent-Mediated $Li_2S$ Electrodeposition—A Critical Manipulator in Lithium-Sulfur Batteries," Adv. Energy Mater, 2019, www.advancedsciencenews.com, pp. 1-10.

Lei Cheng et al., "Sparingly Solvating Electrolytes for High Energy Density Lithium-Sulfur Batteries," ACS Energy Letters, ACS Publications, Jul. 11, 2016, pp. 1-21.

Zhi Wei She et al., "Stable cycling of lithium sulfide cathodes through strong affinity with a bifunctional binder," The Royal Society of Chemistry, RSC Publishing, 2013.

G. Babu et al., "Transition Metal Dichalcogenide Atomic Layers for Lithium Polysulfides Electrocatalysis," Journal of the American Chemical Society, Dec. 6, 2016, pp. 1-26.

M. Yanagi et al., "Effects of Polysulfide Solubility and Li Ion Transport on Performance of Li-S Batteries Using Sparingly Solvating Electrolytes," Journal of the Electrochemical Society, 2020.

David A. Boyd et al.; "Suppression of Transition Metal Dissolution in Mn-Rich Layered Oxide Cathodes with Graphene Nanocomposite Dry Coatings"; 2024 J. Electrochem. Soc.; 171 100532.

* cited by examiner

| Performance indicators | Lithium-sulfur battery cell performance |
|---|---|
| Cell capacity | 6 Ah |
| Energy density | 250 Wh/kg |
| E:S ratio | 6.5 |
| Separator | 14 μm |
| Stack pressure | 0.3 MPa |
| Temperature | 30 C |
| Discharge rate | C/10 |
| Cycle life | 300 |

FIG. 6

SYSTEMS AND METHODS FOR ENGINEERING A COATING MATERIAL DECORATED ON A CONDUCTIVE CARBON SURFACE

CROSS-REFERENCE TO RELATED PATENT APPLICATION

This application claims the benefit of U.S. Provisional Application No. 63/510,216, filed Jun. 26, 2023, entitled "Improving the Future of Electric Trucks by Utilizing Intelligently Interfacially Architectured Li—S Nanostructured Cathodes," the entirety of which is incorporated by reference herein.

FIELD

Apparatuses and methods consistent with the present disclosure relate generally to thin film coating, more specifically, forming an engineered coating deposited on conductive carbon surface and application of the coated carbon, for example, in lithium-ion batteries.

BACKGROUND

Lithium-ion batteries, such as lithium-sulfur batteries, are promising rechargeable batteries. Producing high performance lithium-sulfur batteries is challenging due to the nature of the conversion reactions of long-chain lithium polysulfides ($Li_2S_x$, $4<x<8$) and low sulfur utilization. Unlike common insertion-based cathodes, such as the cathodes of nickel manganese cobalt (NMC) or lithium iron phosphate (LFP) batteries, lithium-sulfur batteries require complete dissolution (liquification) of sulfur and reprecipitation (solidification) as $Li_2S$. Further, the sulfur reduction reaction involves a multistep conversion, with multiple phase changes. This may cause rapid capacity decay, short battery lifetime, and low energy density of lithium-sulfur batteries relative to commercially available Lithium-ion batteries. Batteries capable of facilitating the conversion reactions of lithium polysulfides and improving sulfur utilization are desired.

Many prior known efforts to develop batteries (e.g., lithium-ion batteries) based on carbon have focused on graphene, due to its high conductivity, mechanical strength, and flexibility. Yet, batteries based on graphene suffer challenges due to the production complexities and the relatively high cost of graphene. It is desirable to replace graphene with another carbon material that can overcome these challenges while providing advantageous properties for batteries.

SUMMARY

A first embodiment of the present disclosure includes an engineered coating formed on a conductive carbon, comprising: a coating material disposed on a surface of the conductive carbon either partially or fully covering the carbon particle surface, wherein the coating material comprises at least one material selected from a group comprising: $AlO_x$, $TiO_x$, $SnO_x$, $ZnO_x$, $NbO_x$, $TiNb_xO_y$, $AlP_xO_y$, $MgO_x$, $LiNb_xO_y$, $BO_x$, $CeO_x$, $LiAl_xO_y$, $Sn(PO_4)_x$, $ZrO_x$, $MgAl_xO_y$, $SiO_x$, $NiO_x$, Pt, Pd, Ir, $Ru_xO_y$, $CeZr_xO_y$, $BiO_x$, $TiN_x$, ZnO, ZnS, $MnO_2$, $NbO_2$, $VS_2$, $TiS_2$, $CoS_2$, and $Al_2O_3$.

A second embodiment of the present disclosure includes a method for forming an engineered coating on a conductive carbon surface. The method includes: determining one or more materials to be used for the engineered coating material; and forming the engineered coating, partly or fully coating the surfaces of the conductive carbon particles, wherein the coating material comprises at least one material selected from a group comprising: $AlO_x$, $TiO_x$, $SnO_x$, $ZnO_x$, $NbO_x$, $TiNb_xO_y$, $AlP_xO_y$, $MgO_x$, $LiNb_xO_y$, $BO_x$, $CeO_x$, $LiAl_xO_y$, $Sn(PO_4)_x$, $ZrO_x$, $MgAl_xO_y$, $SiO_x$, $NiO_x$, Pt, Pd, Ir, $Ru_xO_y$, $CeZr_xO_y$, $BiO_x$, $TiN_x$, ZnO, ZnS, $MnO_2$, $NbO_2$, $VS_2$, $TiS_2$, $CoS_2$, and $Al_2O_3$.

A third embodiment of the present disclosure comprises an electrode for a battery cell comprising conductive carbon, the surface on the conductive carbon particles being decorated with an engineered coating material formed on a surface of the conductive carbon, either partly or fully coating the surface of the conductive carbon particles.

A fourth embodiment of the present disclosure comprises a method for forming an electrode for a lithium-ion battery cell. The method comprises the steps of: forming an engineered coating material onto an high surface area conductive carbon additive; dispersing the coated conductive carbon additive into an aqueous or organic solution containing a lithium compound; introducing one or more fibrous carbon conductive additives and one or more binders to produce a slurry; and applying the slurry onto a current collector.

A fifth embodiment of the present disclosure comprises a battery, comprising at least one battery cell comprising: an anode comprising a current collector and an electrochemically active material; a cathode comprising a current collector and an electrochemically active material including conductive carbon, the conductive carbon being decorated with an engineered material, having partial or full coverage of the surface of the conductive particle; an ionically conductive separator disposed between the anode and the cathode; and an electrolyte configured to provide ion transfer between the anode and the cathode.

A sixth embodiment of the present disclosure comprises a method for forming a battery including at least one battery cell. The method comprises the steps of: forming an anode comprising a current collector and an electrochemically active material; forming a cathode comprising a current collector and an electrochemically active material including a conductive carbon, the conductive carbon being decorated with an engineered coating material, either partially or fully coating the surface on the conductive carbon; and disposing between the anode and cathode a separator configured to provide ionic transfer between the anode and the cathode.

BRIEF DESCRIPTION OF FIGURES

FIG. 6 is a table depicting performance indicators of an example 6-Amp hour (Ah) lithium-sulfur battery cell, consistent with certain embodiments of the present disclosure.

DETAILED DESCRIPTION

Figure 1:
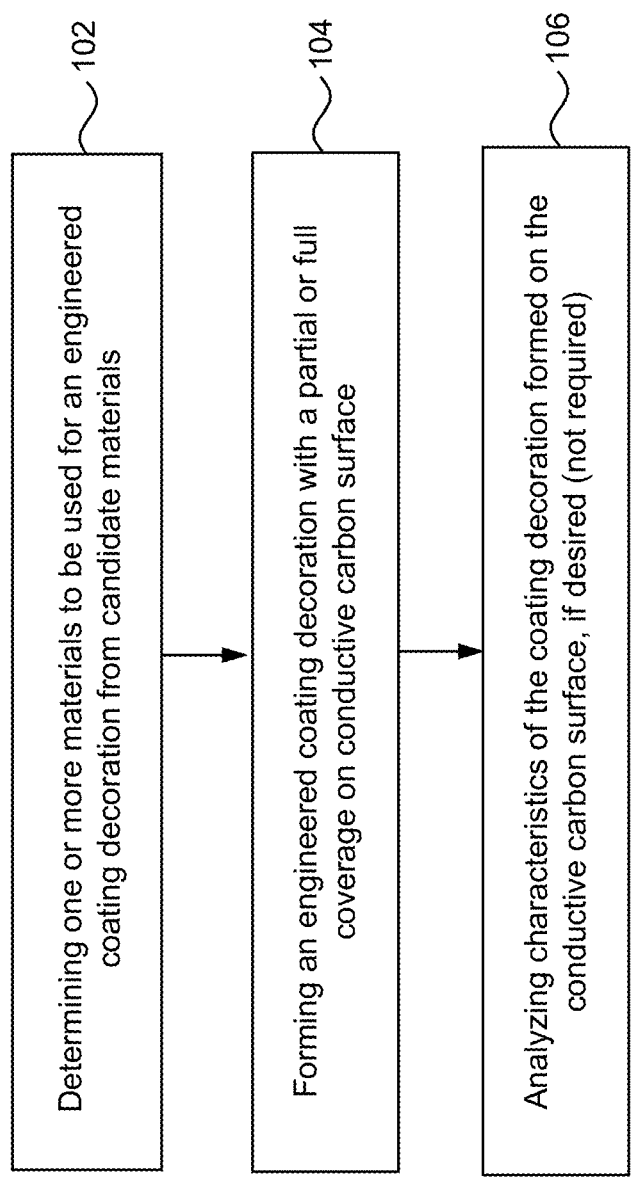
FIG. 1 is a flow chart illustrating a method for forming an engineered coating material decoration on conductive carbon, consistent with embodiments of the present disclosure.

Reference will now be made in detail to exemplary embodiments, examples of which are illustrated in the accompanying drawings. The following description refers to the accompanying drawings, in which the same numbers in different drawings represent the same or similar elements, unless otherwise indicated. The implementations set forth in the following description of exemplary embodiments do not represent all possible implementations consistent with the present disclosure. Instead, they are merely exemplary systems, apparatuses, and methods relating to the present disclosure as recited in the appended claims.

Lithium-sulfur is one of the most promising rechargeable battery chemistries. Yet, problems persist with cycle life due to the nature of the conversion reactions with long-chain ($Li_2S_x$, $4<x<8$) lithium polysulfides irreversibly shuttling from cathode to anode and low sulfur utilization (<60%). This may cause rapid capacity decay over cycle life. While not being bound by any particular mechanism, the inventors note that, in contrast to commonly used insertion-based cathodes, such as nickel manganese cobalt (NMC) or lithium iron phosphate (LFP) batteries, lithium-sulfur batteries require dissolution (liquification) of sulfur and reprecipitation (solidification) as $Li_2S$. In addition, the sulfur reduction reaction involves a multistep conversion with multiple phase changes. For example, at a first step, solid $S_8$ rings may react with lithium ions to form long-chain liquid $Li_2S_8$; at a second step, S—S bond cleavage may continue until liquid $Li_2S_4$ is formed; and at a third step, $Li_2S_4$ may be further reduced to insoluble $Li_2S_2$ and $Li_2S$ products. As the reactions proceed from the first step to the third step, they may become more kinetically sluggish. This slow conversion to solid $Li_2S_2/Li_2S$ may be problematic when polysulfides are in their highest concentrations in the electrolyte, resulting in slow $Li_2S$ precipitation and low sulfur utilization.

Many batteries use conductive carbon in the cathode or anode active material. Among the different carbon materials, graphene is the most widely used in batteries because it offers advantages, such as high conductivity, mechanical strength, and flexibility. Graphene, however, also suffers certain challenges including high cost and complexities in production to achieve the desired purity.

Embodiments of the present disclosure may mitigate or resolve the above-noted issues by tethering and catalyzing polysulfides, improving lithium-sulfur battery cycle life and energy density. Conductive carbon (e.g., carbon nanoparticles) in the cathodes are decorated with an engineered coating that at least partially covers and functions as a substrate to provide improved tethering and facilitate electrocatalytic activity of polysulfides in the cathode.

The coating material is selected based on the absorption energy of $Li_2Sx$ at the binding site, so that the energy difference between the total energy of the absorbates-substrate complex and that of the adsorbate and substrate in isolation is in the range of e.g., 0.5-4.8 eV, thereby accelerating the conversion of $Li_2S_4$ to $Li_2S_2/Li_2S$. The coating material is selected based on the distance between the binding sites and the polysulfides so that the distance between Li/S atoms and binding sites can be ranged in an optimal distance range (e.g., 2.10-2.95 Å), thereby avoiding excess tension between the adsorbed polysulfides and the coating materials and promoting efficient Li—S bond cleavage.

In alternative embodiments, the coating material is engineered to introduce vacancies, interstitials, or substitutional defects, thereby improving redox kinetics for the polysulfides.

FIG. 1 is a flow chart illustrating a method for forming an engineered coating material decoration having a partial or full coverage on conductive carbon, consistent with embodiments of the present disclosure.

Method 100 includes step 102 determining one or more materials to be used for an engineered coating material from a plurality of candidate materials. Candidate materials comprise: $AlO_x$ (e.g., $Al_2O_3$), $TiO_x$, $SnO_x$, ZnO, (e.g., ZnO), $NbO_x$ (e.g., $NbO_2$), $TiNb_xO_y$, $AlP_xO_y$, $MgO_x$, $LiNb_xO_y$, $BO_x$, $CeO_x$, $LiAl_xO_y$, $Sn(PO_4)_x$, $ZrO_x$, $MgAl_xO_y$, $SiO_x$, $NiO_x$, Pt, Pd, Ir, $Ru_xO_y$, $CeZr_xO_y$, $BiO_x$, $TiN_x$, ZnS, $MnO_2$, $VS_2$, $TiS_2$, and $CoS_2$.

Method 100 includes step 104 of forming an engineered coating decoration with a partial coverage or full coverage on conductive carbon. Conductive carbon may be, for example, but is not limited to, carbon nanotubes, carbon nanoparticles, carbon black, carbon fiber, graphite, graphene, and combinations thereof. The degree of coverage of the coating decorated on the surface of conductive carbon particles may be determined using known methods, such as microscale thermogravimetric analysis (μ-TGA), or transmission electron microscopy (TEM), or atomic force microscopy (AFM).

In one or more embodiments, the conductive carbon includes carbon particles, such as, carbon nanoparticles. Carbon particles having a high-surface area, for example, a surface area in a range of 50-3000 $m^2/g$ are preferred by the present inventors. Using high surface area carbon particles, instead of graphene, offers several advantages depending on the application, as described below.

First, using carbon particles is cost-effective. High surface area carbon particles, such as activated carbon, are typically less expensive to produce than graphene, which requires more sophisticated and costly production techniques. The raw materials for high surface area carbon particles are often more readily available and less expensive than those needed for graphene synthesis.

Second, carbon particles offer ease of synthesis and scalability. The processes for producing high surface area carbon particles are well-established, scalable, and less technically demanding than those for producing high-quality graphene. High surface area carbon particles can be produced in large quantities more easily, making them suitable for industrial-scale applications.

Third, carbon particles provide enhanced surface area and porosity. High surface area carbon particles can offer a greater surface area per unit mass relative to some forms of graphene, which can be beneficial for applications like adsorption and catalysis. The porous nature of high surface area carbon particles can enhance their performance in applications such as filtration, gas storage, and as catalyst support.

Fourth, carbon particles provide versatility. High surface area carbon particles are highly effective in adsorption and filtration applications due to their large surface area and porosity. In energy storage devices, such as supercapacitors, high surface area carbon particles can provide excellent electrochemical properties and high capacitance.

Fifth, high surface area carbon particles often exhibit high chemical and thermal stability, making them suitable for use in harsh environments. Their robust nature ensures long-term performance in various applications, from industrial processes to environmental remediation.

Sixth, carbon particles provide application-specific advantages. High surface area carbon particles can be engineered to have specific properties (e.g., pore size distribution, surface functionality) tailored to particular applications. In contrast, graphene may require complex modifications to achieve similar versatility.

In one or more embodiments, the engineered coating material decoration is formed using atomic layer deposition (ALD) method. The method disclosed and claimed of forming the coating material decoration is not limited to ALD. Other deposition methods may also be used, including, without limitation, physical vapor deposition (PVD), molecular layer deposition (MLD), chemical vapor deposition (CVD), vapor phase epitaxy (VPE), atomic layer chemical vapor deposition (ALCVD). In one or more embodiments, the coating material decoration may be formed by exposing the carbon material to reactive precursors. Persons of ordinary skill would understand that various methods could be used depending on the properties and characteristics of the materials involved.

In an embodiment, the coating decoration may be engineered as a thin, uniform, conformal, mechanically stable coating, decorated on the surface of the carbon particles. In an embodiment, the coating decoration is preferably engineered as a discontinuous coating ranging between 50% to 90% of surface area of the carbon particles.

The thickness of the engineered coating material decoration may range between a sub-nanometer thickness to several hundred nanometers. Preferably, the engineered coating material is between sub-nanometer and a few nanometers (e.g., 0.5-1.5 nm) in thickness.

In one or more embodiments, the coating decoration may be engineered to include at least one of: artificially introduced vacancies, artificially introduced interstitials, or artificially introduced substitutional defects. The artificially introduced vacancies, interstitials, and substitutional defects are not related to the degree of the coverage of the coating decoration.

The characteristics of the coating decoration formed on the conductive carbon surface can be analyzed, if desired. This further analysis is not required. If desired, TEM images may be obtained to analyze thickness and/or coverage of the coating material on the surface of the carbon particles. TEM images of the carbon particles, before and after applying the coating material (uncoated or pristine carbon) may also be obtained.

Inductively Coupled Plasma (ICP) analysis of the coated carbon may be performed to determine the content of a metal in the coating decoration.

Brunauer-Emmett-Teller (BET) Specific Surface Area (SSA) analysis of the coated carbon may be performed to determine the surface area of the coated carbon particles. For comparison, BET SSA analysis of uncoated carbon may be performed.

Figure 2B:
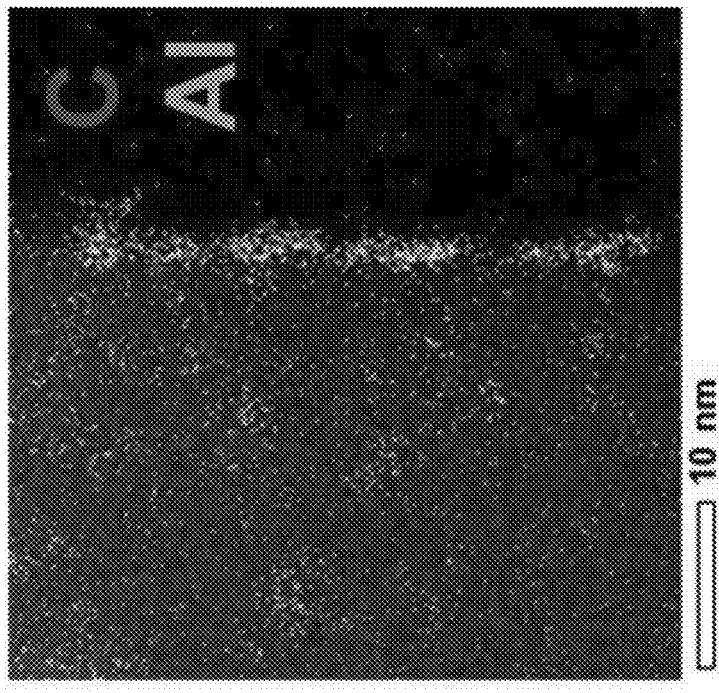
FIG. 2B is a TEM image depicting a surface of a graphite particle after applying an engineered coating material, consistent with certain embodiments of the present disclosure.
Figure 2A:
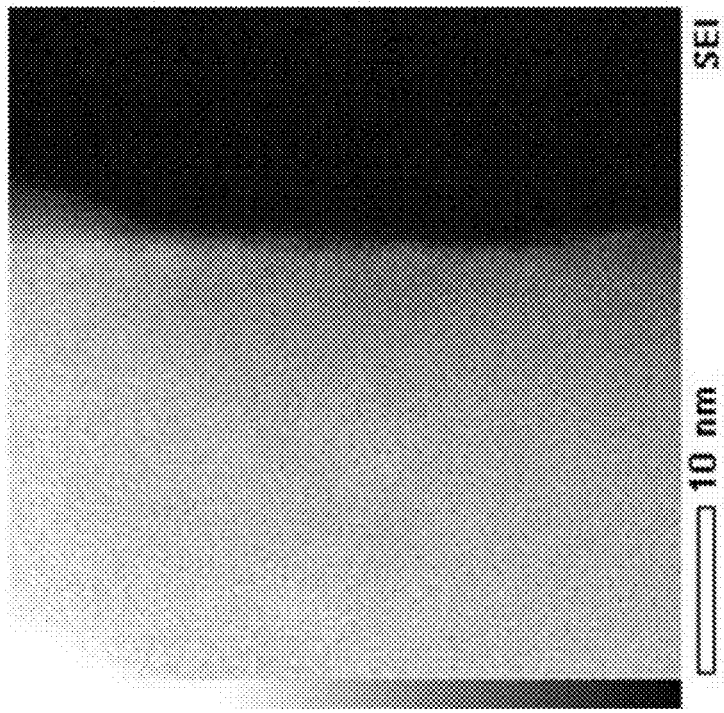
FIG. 2A is a transmission electron microscopy (TEM) image depicting a surface of a graphite particle before applying an engineered coating material.

FIG. 2A is a TEM image depicting a surface of a graphite particle before applying a coating decoration; and FIG. 2B is a TEM image depicting a surface of a graphite particle after applying an engineered coating decoration, consistent with certain embodiments of the present disclosure. Referring to FIG. 2A, the surface of the uncoated graphite particle is in direct contact with electrolyte. As indicated in FIG. 2A, a solid electrolyte interphase (SEI) decoration is formed due to electrochemical reaction at the electrode surface, for example, oxidation at the cathode.

Referring to FIG. 2B, in an embodiment of the present disclosure, $Al_2O_3$ is the coating material. FIG. 2B shows an exemplary engineered $Al_2O_3$ coating decoration (green) at a scale of 10 nanometers. The engineered $Al_2O_3$ coating decoration was formed on the surface of the graphite particle by ALD and has a thickness of 1-2 nm. The engineered $Al_2O_3$ coating decoration shown in FIG. 2B is discontinuous.

Figure 3:
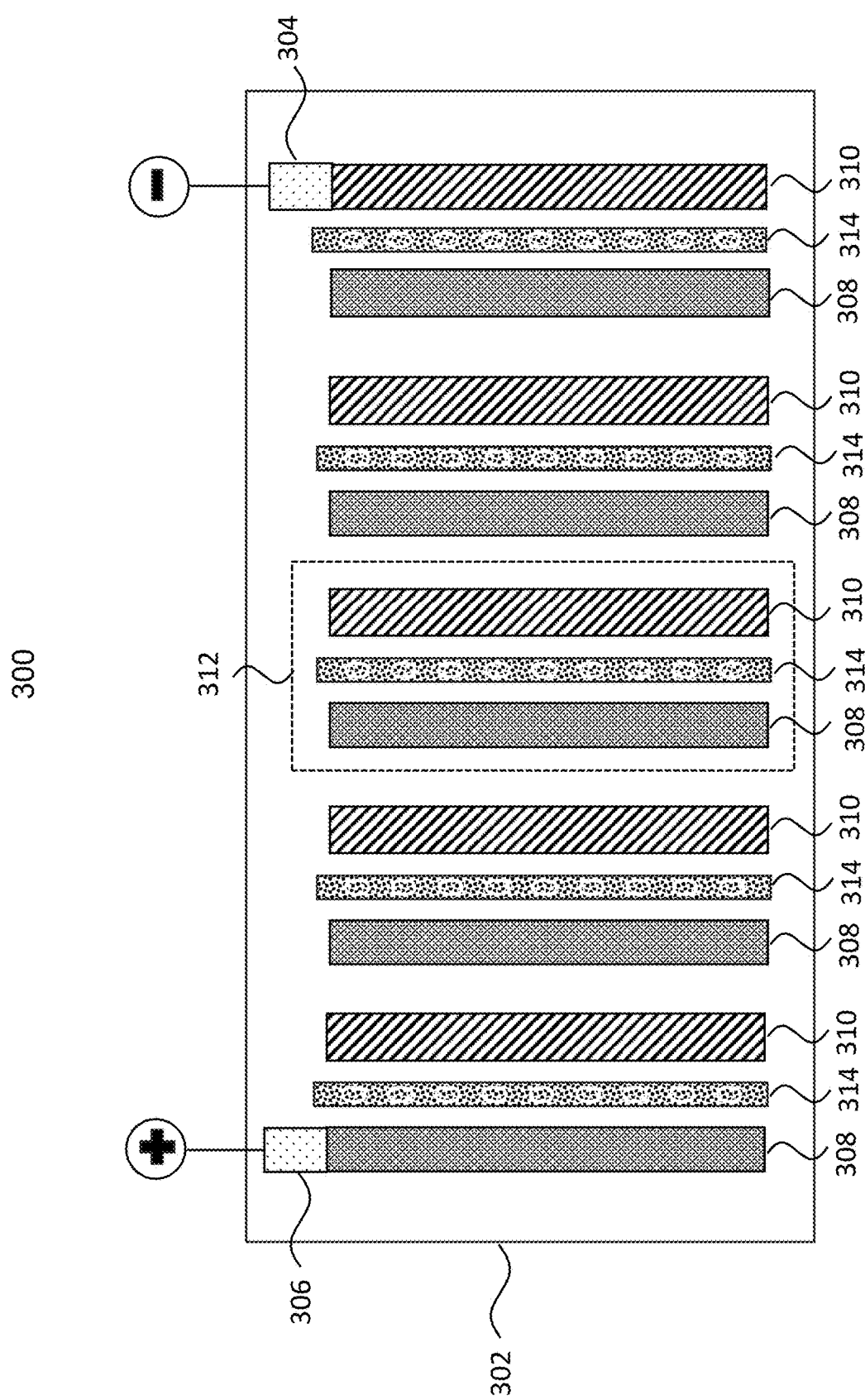
FIG. 3 is a schematic diagram illustrating a battery including an engineered coating material decoration on conductive carbon particles, consistent with one or more embodiments of the present disclosure.

FIG. 3 is a schematic diagram illustrating a battery including an engineered coating decoration on conductive carbon, consistent with one or more embodiments of the present disclosure. Referring to FIG. 3, battery 300 may include casing 302 having positive terminal 306 and negative terminal 304. As depicted in FIG. 3, anodes 308, cathodes 310, and separators 314 may be disposed within casing 302. One or more of anodes 308 may have the same or different material compositions. Similarly, one or more of cathode 310 may have the same or different material compositions. Battery 300 may include a plurality of battery cells, for example, five battery cells, as shown in FIG. 3. Any number of battery cells can be used. As shown in FIG. 3, battery cell 312 includes anode 308, separator 314, and cathode 310. In one or more embodiments, anode 308 may include metal foil as a current collector. Metal foil may be copper, nickel, titanium, or any other suitable metal foil.

In one or more embodiments, anode 308 may include: an oxidizable metal (e.g., lithium); material capable of intercalating the oxidizable metal (e.g., graphite or silicon); electrolyte; a binder (e.g., polyethylene oxide, polyacrylonitrile, polyvinylidene fluoride, or polyvinylidene fluoride-hexafluoropropylene); and an electronically conductive additive (e.g., carbon black, graphite, or graphene). In one or more embodiments, anode 308 may also include ionically conductive materials. In one or more embodiments, anode 308 may comprise metallic lithium and/or metallic lithium alloys. Metallic lithium alloys may include, but are not limited to: Li—Al, Li—Mg, Li—Cu, Li—Si, and/or Li—Sn.

In one or more embodiments, separator 314 may be an ionically conductive material, such as porous polymer (e.g., polyolefins), polymer electrolyte (e.g., polystyrene-polyethylene oxide (PS-PEO)), ceramic (e.g., lithium phosphorous oxynitride (LiPON), lithium aluminum titanium phosphate (LATP), or lithium aluminum germanium phosphate (LAGP), lithium lanthanum zirconium oxide (LLZO)), and/or 2-dimensional sheet structures (e.g., graphene, boron nitride, or dichalcogenides).

In one or more embodiments, cathode 310 comprises metal foil as a current collector, for example, but not limited to, aluminum, titanium, nickel, or nickel foil. Cathode 310 may include an electrochemically active cathode material comprising conductive carbon. Conductive carbon material may comprise, for example, but is not limited to, carbon nanotubes, carbon nanoparticles, carbon black, carbon fiber, graphite, graphene and combinations thereof. In one or more embodiments, conductive carbon has high-surface area, for example, a surface area in a range of 50-3000 $m^2/g$.

In one or more embodiments, conductive carbon particles are decorated with an engineered coating material that functions as binding sites for polysulfides. The engineered coating decoration may be formed using the method described above with respect to FIG. 1.

In one or more embodiments, the engineered coating material may include one or more materials selected from a group of materials comprising: $AlO_x$ (e.g., $Al_2O_3$), $TiO_x$, $SnO_x$, $ZnO_x$ (e.g., ZnO), $NbO_x$ (e.g., $NbO_2$), $TiNb_xO_y$, $AlP_xO_y$, $MgO_x$, $LiNb_xO_y$, $BO_x$, $CeO_x$, $LiAl_xO_y$, $Sn(PO_4)_x$, $ZrO_x$, $MgAl_xO_y$, $SiO_x$, $NiO_x$, Pt, Pd, Ir, $Ru_xO_y$, $CeZr_xO_y$, $BiO_x$, $TiN_x$, ZnS, $MnO_2$, $VS_2$, $TiS_2$, and $CoS_2$.

While not bound by theory, in one or more embodiments, the engineered coating material may be selected using first-principles density functional theory (DFT) theory to calculate the adsorption energy and lattice parameters of amorphized candidates and adsorbing long-chain polysulfides ($Li_2S_x$, 4<x<8). DFT is a computational modelling method widely used in physics, chemistry, and materials science since the 1970s.

Metal sulfides are often amorphous or maintain very fine nano-crystalline structures when applied as an ultra-thin film (e.g., by ALD). To computationally replicate the amorphous nature of materials, a combination of classical molecular dynamics (MD) and ab initio molecular dynamics (AIMD) approaches are implemented. Classical molecular dynamics is a known simulation method that allows mathematical description of the interactions of atoms and molecules with each other. AIMD is a known simulation method that allows simulation of complex molecular systems and processes, including chemical reactions.

In one or more embodiments, amorphous structures may be modelled by performing MD simulation at high temperature, followed by quenching. In one or more embodiments, to simulate non-stoichiometry of the coating material, supercell method may be implemented to introduce vacancies, interstitials, and/or substitutional atoms. Supercell method is a known method for defect calculations. In supercell method, the defect of interest is simply incorporated in a finite atomic cluster.

Structural optimization of the polysulfide, transition metal surfaces, and the combined polysulfide/transition metal surface may be performed, to identify the stable configuration and total energy of each component. Periodic, electronic structure calculations may be performed with a generalized gradient approximation (GGA) functional using software tools such as Quantum Espresso. GGA is an approximation to the exchange-correlation energy functional in density functional theory for calculating total energy of a material.

Initial structural relaxations test for the requirement of van der Waals corrections, and an appropriate k-mesh for energy convergence may also be performed. Initial structural relaxations test is a calculation to ensure that the initial crystalline structure is fully relaxed and optimized within some approximate tolerance criteria being monitored. K-mesh is a mesh or grid of points in the Brillouin zone where calculations are performed. Determining the appropriate k-mesh involves finding a balance between accuracy and computational cost.

Binding energy may be calculated by taking the difference of the various components of the system, using the following equation:

$$E_{binding} = E_{total}(MY_2 + P) - E_{total}(MY_2) - E_{total}(P)$$

where $E_{total}$ is the total energy of the system; M=Nb, Sn, Zn; Y=S, O; and P=$Li_2Sx$, 4<x<8. A negative value for $E_{binding}$ indicates a stable adsorption.

In one or more embodiments, conductive carbon particles are decorated with an engineered coating material that functions as binding sites for polysulfides. The engineered coating material may be decorated onto the carbon particles by atomic layer deposition (ALD). As embodied herein, the method of forming the thin film is not limited to ALD. Other deposition methods may also be used, including, without limitation, physical vapor deposition (PVD), molecular layer deposition (MLD), chemical vapor deposition (CVD), low pressure chemical vapor deposition (LPCVD), vapor phase epitaxy (VPE), atomic layer chemical vapor deposition (ALCVD), or other suitable methods that accomplish the decoration of the carbon particles with a suitable thin-film coating material. In one or more embodiments, the engineered coating may be formed by exposing the carbon material to reactive precursors. Persons of ordinary skill would understand that various methods could be used depending on the properties and characteristics of the materials involved.

The thickness of the engineered coating may range between a sub-nanometer thickness to several hundred nanometers. Preferably, the thickness of the thin film is between sub-nanometer and a few nanometers (e.g., 0.5-1.5 nm) in size.

Figure 4:
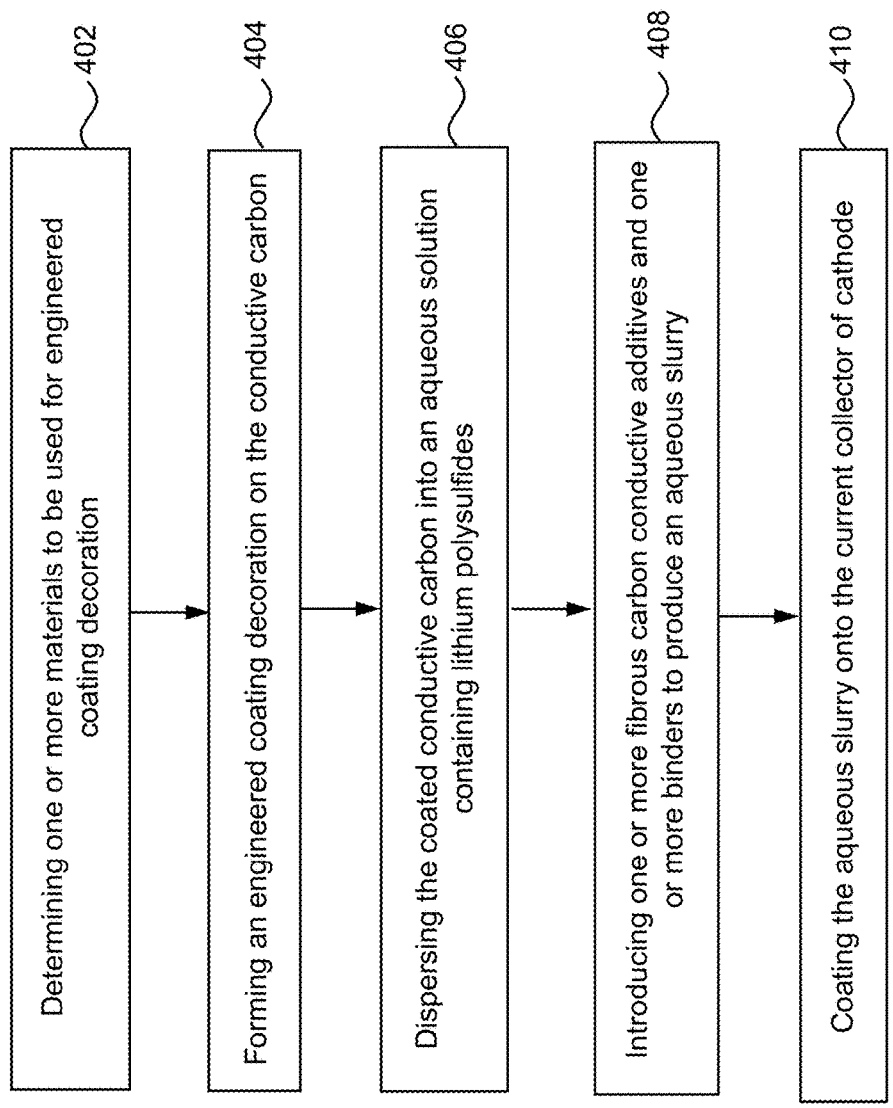
FIG. 4 is a flow chart illustrating a method for forming an electrode of a lithium-sulfur battery cell, consistent with one or more embodiments of the present disclosure.

FIG. 4 is a flow chart illustrating a method for forming a cathode of a battery cell of a battery, consistent with one or more embodiments of the present disclosure. The battery may be lithium-sulfur battery. For example, the battery cell may be the battery cell 312 of FIG. 3.

Method 400 includes step 402 of determining one or more materials to be used for an engineered coating material from a plurality of candidate materials. Candidate materials tuned to accelerate the conversion of liquid polysulfides to $Li_2S_2$/$Li_2S$ are determined. Candidate materials comprise: $AlO_x$ (e.g., $Al_2O_3$), $TiO_x$, $SnO_x$, $ZnO_x$ (e.g., ZnO), $NbO_x$ (e.g., $NbO_2$), $TiNb_xO_y$, $AlP_xO_y$, $MgO_x$, $LiNb_xO_y$, $BO_x$, $CeO_x$, $LiAl_xO_y$, $Sn(PO_4)_x$, $ZrO_x$, $MgAl_xO_y$, $SiO_x$, $NiO_x$, Pt, Pd, Ir, $Ru_xO_y$, $CeZr_xO_y$, $BiO_x$, $TiN_x$, ZnS, $MnO_2$, $VS_2$, $TiS_2$, and $CoS_2$.

Method 400 includes step 404 of forming an engineered coating material decorated on the surface of the conductive carbon particles. The method of forming engineered coating decoration on the conductive carbon particles is similar to method 100 described with respect to FIG. 1. For the sake of brevity, the detail of the method is omitted here.

Method 400 includes step 406 of dispersing the coated conductive carbon into an aqueous solution containing lithium polysulfides. The coated conductive carbon formed at step 404 is dispersed into an aqueous solution containing lithium polysulfides that are subsequently reduced to sulfur on the coated conductive carbon.

Method 400 includes step 408 of introducing one or more conductive additives and one or more binders to produce an aqueous slurry. The one or more conductive additives may be one or more fibrous carbon conductive additives. Following coating of the active materials with sulfur at the step 406, fibrous carbon conductive additives (e.g., carbon nanofiber or carbon nanotube) are introduced along with binders to produce an aqueous slurry that is subsequently coated onto the cathode current collect (e.g., aluminum foil).

Method 400 includes step 410 of coating the aqueous slurry onto the current collector of a cathode. The slurry prepared at step 408 may be coated onto an aluminum foil that used as a current collector of a cathode to form the cathode.

The present disclosure describes method for forming cathode using lithium-sulfur battery as an example. However, the scope of the present disclosure is not so limited. The methods described in the present disclosure can be applied to anode of lithium-sulfur batteries. Further, methods described in the present disclosure can be applied to any electrode of any rechargeable batteries, fuel cells, air electrode, etc.

Figure 5:
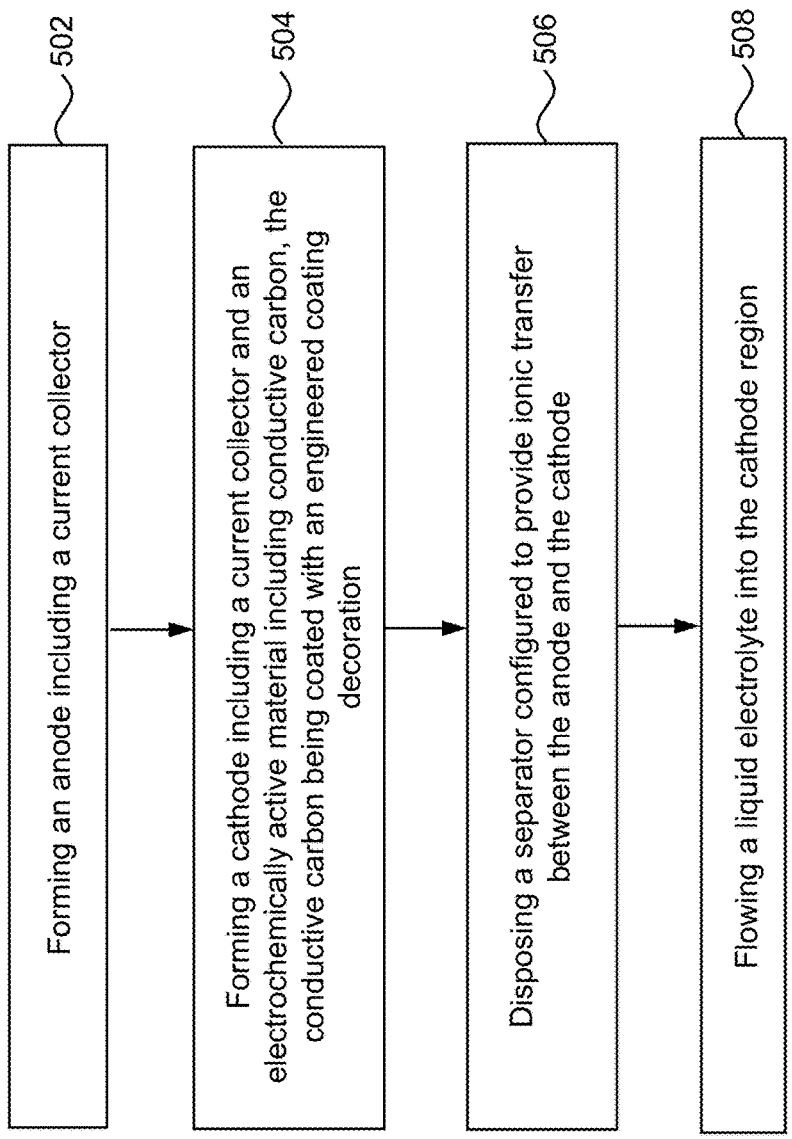
FIG. 5 is a flow chart illustrating a method for forming a battery comprising at least one lithium-sulfur battery cell, consistent with one or more embodiments of the present disclosure.

FIG. 5 is a flow chart illustrating method 500 for forming a battery comprising at least one battery cell, consistent with one or more embodiments of the present disclosure. In one or more embodiments, the battery is a lithium-sulfur battery.

Method 500 includes step 502 of forming an anode. For example, the anode may be an anode of a battery cell, such as the anode 308 of FIG. 3. Anode may be formed by a conventional method. The process of forming anode is well-known to persons or ordinary skill and for sake of simplifying this disclosure, is omitted here.

Method 500 includes step 504 of forming a cathode comprising a current collector and an electrochemically active material including conductive carbon, the conductive carbon being decorated with an engineered coating material. For example, the cathode may be a cathode in a battery cell, such as the cathode 310 of FIG. 3. The cathode may be formed using the method of FIG. 4.

Method 500 includes step 506 of disposing between anode and cathode a separator configured to provide ionic transfer between the anode and the cathode. For example, the separator may be separator 314 as shown in FIG. 3.

Method 500 may include step 508 of flowing a liquid electrolyte into the cathode region. The liquid electrolyte may include a lithium reaction product. In an alternative embodiment, the electrolyte is a solid electrolyte and is a part of the separator. In this alternative embodiment, step 508 is omitted.

In a lithium-sulfur cell, in one or more embodiments, electrolyte may represent at least 40% of the cell weight. Electrolyte is necessary for the solid to liquid conversion reactions. The weight of the electrolyte may be reduced by reducing cathode porosity. Reducing cathode porosity may negatively affect sulfur utilization. Selecting electrolytes that are sparingly soluble for lithium polysulfides, electrode porosity may be decreased but kinetics may become more sluggish.

In an alternative embodiment, by enabling ultra-fast kinetics in the new electrolyte systems with cathode porosities below 60%, the energy density of the lithium-sulfur cell may reach or exceed 450 Wh/kg and 700 Wh/L.

Embodiments of the present disclosure provide engineered thin coating decorations on conductive carbon in the cathodes that function as tethering and catalyzing substrate in the cathodes for polysulfides.

Example 1

In this example, NbOx thin film coating material was decorated onto the carbon black powder particles. The NbOx coating is formed by the method of FIG. 1. Table 1 shows a comparison of certain characteristics of engineered NbOx coating material decorated on the carbon black powder particles and pristine (uncoated) carbon black powder particles.

TABLE 1

NbOx coating on carbon black powder particles

| Sample | Mass (g) | ICP Nb (ppm) | Expected ICP Nb (ppm) | BET SSA ($m^2/g$) | Moisture (ppm) |
|---|---|---|---|---|---|
| Pristine | — | 0 | 0 | 58.58 | 126.7 |
| Coated | 45 | 51,287 | 39,556 | 64.44 | — |

As shown in Table 1, the mass of the coated sample is 45 g. ICP analysis was performed on all samples to determine the metal (Nb) content. The ICP analysis of the pristine sample shows 0 ppm Nb content. The ICP analysis of the coated sample shows that the Nb content is 51,287 ppm, higher than the expected Nb content of 39,556 ppm.

BET SSA analysis of the pristine sample and the coated sample are also provided. The coated sample shows the surface area of 65.44 $m^2/g$, which is greater than the surface area of the pristine sample is 58.58 $m^2/g$.

Moisture analysis was also performed on the uncoated and coated samples during which the samples were heated to a maximum of 275° C. over the course of ~15 mins.

Example 2

In this example, NbOx thin film coating material was decorated onto the carbon black powder particles. The NbOx coating is formed by the method of FIG. 1. Compared with the NbOx coating in Table 1, the carbon black powder particles in this example were loaded with higher load of the coating materials and thus, have thicker coating decoration. The mass of the coated sample is 45 g. Table 2 shows a comparison of certain characteristics of engineered NbOx coating material decorated on the carbon black powder particles and pristine (uncoated) carbon black powder particles.

TABLE 2

NbOx coating on carbon black powder particles

| Sample | Mass (g) | ICP Nb (ppm) | Expected ICP Nb (ppm) | Moisture (ppm) |
|---|---|---|---|---|
| Pristine | — | 0 | 0 | 126.7 |
| Coated | 45 | 25,858 | 262,084 | — |

As shown in Table 2, the mass of the coated sample is 45 g. ICP analysis was performed on all samples to determine the metal (Nb) content. The ICP analysis of the pristine sample shows 0 ppm Nb content. The ICP analysis of the coated sample shows that the Nb content is 25,858 ppm, lower than the expected Nb content of 262,084 ppm.

Moisture analysis was also performed on the uncoated and coated samples during which the samples were heated to a maximum of 275° C. over the course of ~15 mins.

Example 3

In this example, SnOx thin film coating material was decorated onto the carbon black powder particles. The SnOx coating is formed by the method of FIG. 1. Table 3 shows a comparison of certain characteristics of engineered SnOx coating material decorated on the carbon black powder particles and pristine (uncoated) carbon black powder particles.

TABLE 3

SnOx coating on carbon black powder particles

| Sample | Mass (g) | ICP Sn (ppm) | Expected ICP Sn (ppm) | BET SSA (m²/g) | Moisture (ppm) |
|---|---|---|---|---|---|
| Pristine | — | 0 | 0 | 58.58 | 126.7 |
| Coated | 45 | 31,726 | 36,395 | 59.4 | — |

As shown in Table 3, the mass of the coated sample is 45 g. ICP analysis was performed on all samples to determine the metal (Sn) content. The ICP analysis of the pristine sample shows 0 ppm Sn content, as expected. The ICP analysis of the coated sample shows that the Sn content is 31,726 ppm, lower than the expected Sn content of 36,395 ppm.

BET SSA analysis of the pristine sample and the coated sample are also provided. The coated sample shows the surface area of 59.4 m²/g, which is greater than the surface area of the pristine sample is 58.58 m²/g.

Moisture analysis was also performed on the uncoated and coated samples during which the samples were heated to a maximum of 275° C. over the course of ~15 mins.

Example 4

In this example, SnOx thin film coating material was decorated onto the carbon black powder particles. The SnOx coating is formed by the method of FIG. 1. Compared with the SnOx coating in Table 3, the carbon black powder particles in this example were loaded with higher load of the coating materials and thus, have thicker coating decoration. Table 4 shows a comparison of certain characteristics of engineered SnOx coating material decorated on the carbon black powder particles and pristine (uncoated) carbon black powder particles.

TABLE 4

SnOx coating on carbon black powder particles

| Sample | Mass (g) | ICP Sn (ppm) | Expected ICP Sn (ppm) | BET SSA (m²/g) | Moisture (ppm) |
|---|---|---|---|---|---|
| Pristine | — | 0 | 0 | 58.58 | 126.7 |
| Coated | 45 | 77,042 | 257,056 | 49.96 | — |

As shown in Table 4, the mass of the coated sample is 45 g. ICP analysis was performed on all samples to determine the metal (Sn) content. The ICP analysis of the pristine sample shows 0 ppm Sn content, as expected. The ICP analysis of the coated sample shows that the Sn content is 77,042 ppm, lower than the expected Sn content of 257,056 ppm.

BET SSA analysis of the pristine sample and the coated sample are also provided. The coated sample shows the surface area of 49.96 m²/g, which is smaller than the surface area of the pristine sample is 58.58 m²/g.

Moisture analysis was also performed on the uncoated and coated samples during which the samples were heated to a maximum of 275° C. over the course of ~15 mins.

Example 5

In this example, $Al_2O_3$ thin film coating material was decorated onto the carbon black powder particles. The $Al_2O_3$ coating is formed by the method of FIG. 1. Table 5 shows a comparison of certain characteristics of engineered $Al_2O_3$ coating material decorated on the carbon black powder particles and pristine (uncoated) carbon black powder particles.

TABLE 5

$Al_2O_3$ coating on carbon black powder particles

| Sample | Mass (g) | ICP Al (ppm) | Expected ICP Al (ppm) | BET SSA (m²/g) | Moisture (ppm) |
|---|---|---|---|---|---|
| Pristine | — | 0 | 0 | 58.58 | 126.7 |
| Coated | 45 | 5,422 | 86,248 | 53.1 | — |

As shown in Table 5, the mass of the coated sample is 45 g. ICP analysis was performed on all samples to determine the metal (Al) content. The ICP analysis of the pristine sample shows 0 ppm Al content, as expected. The ICP analysis of the coated sample shows that the Al content is 5,422 ppm, lower than the expected Al content of 86,248 ppm.

BET SSA analysis was performed for the pristine sample and the $Al_2O_3$ coated sample. The coated sample has a surface area of 53.1 m²/g, while the surface area of the pristine sample was 58.58 m²/g.

Moisture analysis was also performed on the uncoated and coated samples during which the samples were heated to a maximum of 275° C. over the course of ~15 mins.

Example 6

In this example, ZnOx thin film coating material was decorated onto the carbon black powder particles. The ZnOx coating is formed by the method of FIG. 1. Table 6 shows a comparison of certain characteristics of engineered ZnOx coating material decorated on the carbon black powder particles and pristine (uncoated) carbon black powder particles.

TABLE 6

ZnOx coating on carbon black powder particles

| Sample | Mass (g) | ICP Zn (ppm) | Expected ICP Zn (ppm) | BET SSA (m²/g) | Moisture (ppm) |
|---|---|---|---|---|---|
| Pristine | — | 0 | 0 | 58.58 | 126.7 |
| Coated | 45 | 684.5 | 77,470 | 61.96 | — |

As shown in Table 6, the mass of the coated sample is 45 g. ICP analysis was performed on all samples to determine the metal (Zn) content. The ICP analysis of the pristine sample shows 0 ppm Zn content, as expected. The ICP analysis of the coated sample shows that the Zn content is 684.5 ppm, lower than the expected Zn content of 77,470 ppm.

BET SSA analysis was performed for the pristine sample and the ZnOx coated sample. The coated sample has a surface area of 61.96 m²/g, while the surface area of the pristine sample was 58.58 m²/g.

Moisture analysis was also performed on the uncoated and coated samples during which the samples were heated to a maximum of 275° C. over the course of ~15 mins.

Example 7

In this example, ZnOx thin film coating material was decorated onto the carbon black powder particles. The ZnOx coating is formed by the method of FIG. 1. Compared with the ZnOx coating in Table 6, the carbon black powder particles in this example were loaded with higher load of the coating materials and thus, have thicker coating decoration. Table 7 shows a comparison of certain characteristics of engineered ZnOx coating material decorated on the carbon black powder particles and pristine (uncoated) carbon black powder particles.

TABLE 7

ZnOx coating on carbon black powder particles

| Sample | Mass (g) | ICP Zn (ppm) | Expected ICP Zn (ppm) | BET SSA ($m^2/g$) | Moisture (ppm) |
|---|---|---|---|---|---|
| Pristine | — | 0 | 0 | 58.58 | 126.7 |
| Coated | 45 | 54,510 | 414,752 | 60.95 | — |

As shown in Table 7, the mass of the coated sample is 45 g. ICP analysis was performed on all samples to determine the metal (Zn) content. The ICP analysis of the pristine sample shows 0 ppm Zn content, as expected. The ICP analysis of the coated sample shows that the Zn content is 54,510 ppm, lower than the expected Zn content of 414,752 ppm.

BET SSA analysis was performed for the pristine sample and the ZnOx coated sample. The coated sample has a surface area of 60.95 $m^2/g$, while the surface area of the pristine sample was 58.58 $m^2/g$.

Moisture analysis was also performed on the uncoated and coated samples during which the samples were heated to a maximum of 275° C. over the course of ~15 mins.

Example 8

In this example, coated conductive carbon for a cathode of a lithium-sulfur battery was formed using the method of FIG. 1. The coated conductive carbon was dispersed into an aqueous solution-containing lithium compound. Lithium polysulfides were subsequently reduced to sulfur on the coated conductive carbon. The sulfur reduction is performed at a 50 g batch size. After the sulfur reduction, the material was further classified to 10 μm and characterized by scanning electron microscope (SEM) and Energy-dispersive X-ray spectroscopy (EDS) to determine morphology and verify the coating decoration. Following coating of the active materials with sulfur, fibrous carbon conductive additives was introduced along with binders to produce an aqueous slurry that is subsequently coated onto the cathode current collect (aluminum foil).

The characterization results of the lithium-sulfur battery cell showed that the sulfur utilization reached about 50-70% at capacities up to 10 Amp hour (Ah) and specific energy was greater than 400 Wh/kg.

Example 9

In this example, a 6 Ah lithium-sulfur battery cell is formed using 60 mm×80 mm composite cathodes with 5.0 mgS/$cm^2$. The lithium-sulfur battery cell is formed using the method of FIG. 5. FIG. 6 is a table depicting lithium-sulfur performance indicators of the example 6 Ah lithium-sulfur battery cell.

Excess electrolyte is indicated using electrolyte-to-sulfur ratio (E:S ratio). As shown in the table, at a E:S ratio of 6.5, the cycle life of the lithium-sulfur pouch cell is 300 cycles, the energy density of the lithium-sulfur pouch cell is 250 Wh/kg. Other performance indicators, such as stack pressure, discharge rate, and temperature of the lithium-sulfur battery cell are also shown in the table.

Figure 7:
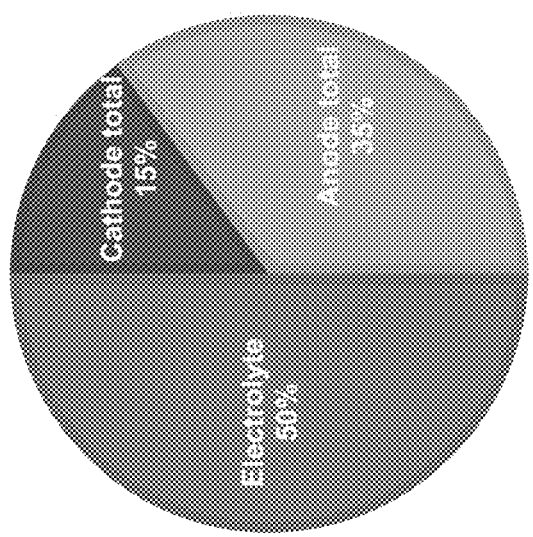
FIG. 7 is a pie chart depicting mass distribution of the example 6 Ah lithium-sulfur battery cell, consistent with one or more embodiments of the present disclosure.

FIG. 7 is a pie chart depicting the mass distribution of the example 6 Ah lithium-sulfur battery cell. The contribution of electrolyte to overall cell mass is 50%, the contribution of the cathode to overall cell mass is 15%, and the contribution of the anode to overall cell mass is 35%.

Figure 8A:
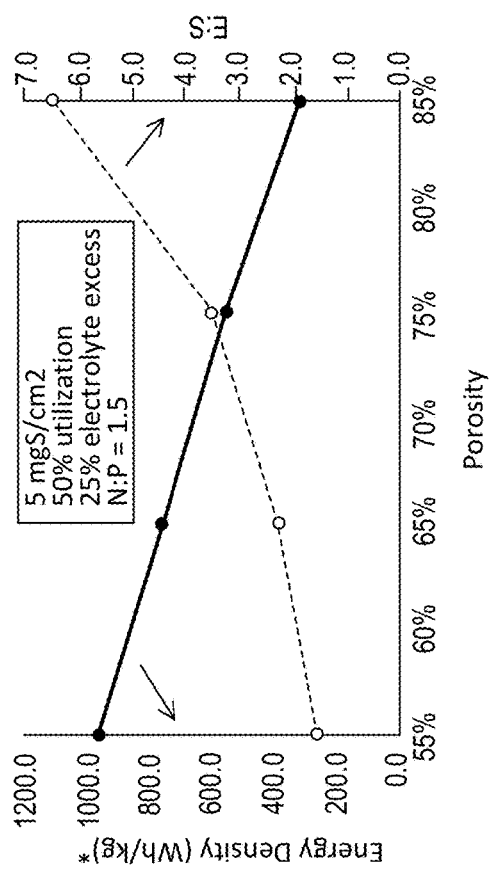
FIG. 8A is a plot depicting an example cell model, indicating the relationship between energy density and porosity, and the relationship between E:S ratio and porosity of the example 6 Ah battery cell, consistent with one or more embodiments of the present disclosure.

FIG. 8A is a plot depicting an example cell model result indicating the relationship between energy density and porosity, and the relationship between E:S ratio and porosity of the example 6 Ah battery cell.

Figure 8B:
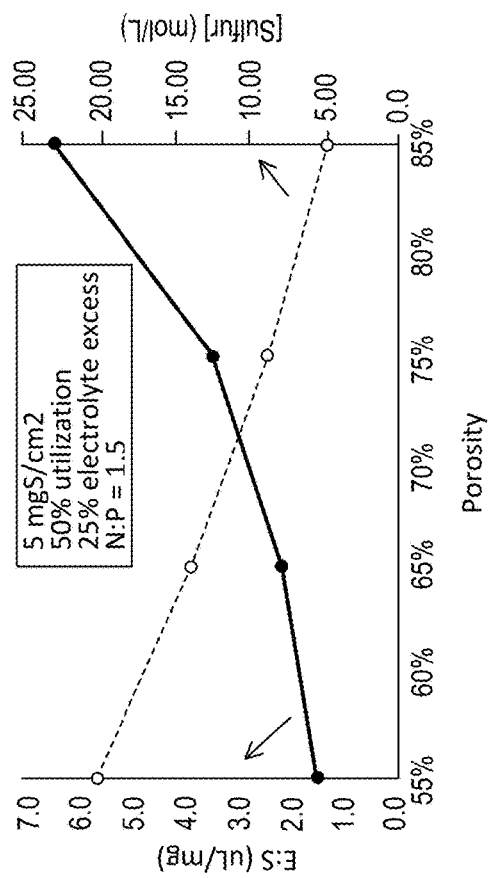
FIG. 8B is a plot depicting an exemplary cell model, indicating the relationship between E:S ratio and porosity, and the relationship between sulfur concentration and porosity of the example 6 Ah battery cell, consistent with one or more embodiments of the present disclosure.

FIG. 8B is a plot depicting an example cell model result indicating the relationship between E:S ratio and porosity, and the relationship between sulfur concentration and porosity of the 6 Ah battery cell.

As shown in FIG. 8A and FIG. 8B, an example cell model result validated against cell data at the 6 Ah scale for porosities above 75%. With 25% excess electrolyte, the E:S ratio is about 6.5, which leads to a dissolved sulfur concentration of 5 M approximately. For a cathode calendared to 55% with the same 25% electrolyte excess, the E:S ratio is about 1.5, translating to a cell-level energy density of 1000 Wh/kg. This may require around 20 M concentration of sulfur in the electrolyte, which may seem impractical based on prior known sulfur solubility concepts.

The present disclosure described lithium-sulfur as an exemplary embodiment. However, the scope of the present disclosure is not so limited. The methods described in the present disclosure can be applied to other lithium-ion batteries or any other batteries that do not use lithium.

As used in this disclosure, use of the term "or" in a list of items indicates an inclusive list. The list of items may be prefaced by a phrase such as "at least one of" or "one or more of." For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification, the terms "comprise," "include," or "contain" may be used interchangeably and have the same meaning and are to be construed as inclusive and open-ended. The terms "comprise," "include," or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

The flowcharts and block diagrams in the figures illustrate examples of the architecture, functionality, and operation of possible implementations of systems, methods, and devices according to various embodiments. It should be noted that, in some alternative implementations, the functions noted in blocks may occur out of the order noted in the figures. For example, two blocks shown in succession may, in fact, be executed substantially concurrently, or the blocks may sometimes be executed in the reverse order, depending upon the functionality involved. Likewise, additional steps may be included in such methods, and certain steps may be omitted or combined, in methods consistent with various embodiments.

It is understood that the described embodiments are not mutually exclusive, and elements, components, materials, or steps described in connection with one example embodiment may be combined with, or eliminated from, other embodiments in suitable ways to accomplish desired design objectives.

Reference herein to "some embodiments" or "some exemplary embodiments" means that a particular feature, structure, or characteristic described in connection with the embodiment can be included in at least one embodiment. The appearance of the phrases "one embodiment" "some embodiments" or "another embodiment" in various places in the present disclosure do not all necessarily refer to the same embodiment, nor are separate or alternative embodiments necessarily mutually exclusive of other embodiments.

Additionally, the articles "a" and "an" as used in the present disclosure and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

Considering the significant values of a number, for a value that has no decimal point, the rightmost nonzero digit is the least significant digit. If there is a decimal point in the value, the rightmost digit is the least significant digit, even if it is a zero. All digits between the least and most significant digits are counted as significant. Whether there is a decimal point or not, the rightmost digit (zero or nonzero) will be read as ±½ to indicate the uncertainty of scientific measurement, e.g., 0.5 will be read as a value between 0.45 and 0.55 instead of a single value 0.5. Another example is 1.50 will be read as a value between 1.45 and 1.55 instead of a single value 1.50.

Although the elements in the following method claims, if any, are recited in a particular sequence, unless the claim recitations otherwise imply a particular sequence for implementing some or all of those elements, those elements are not necessarily intended to be limited to being implemented in that particular sequence.

It is appreciated that certain features of the present disclosure, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not essential features of those embodiments, unless noted as such.

It will be further understood that various modifications, alternatives, and variations in the details, materials, and arrangements of the parts which have been described and illustrated in order to explain the nature of described embodiments may be made by those skilled in the art without departing from the scope. Accordingly, the following claims embrace all such alternatives, modifications, and variations that fall within the terms of the claims.

What is claimed is:

1. An engineered coating material formed on the surface of a conductive carbon material and at least partially covering the surface of the conductive carbon material, the engineered coating material comprising:
    a plurality of binding sites, wherein each binding site is configured to interface with at least one polysulfide; and,
    at least one material selected from a group comprising: $AlO_x$, $TiO_x$, $SnO_x$, $ZnO_x$, $NbO_x$, $TiNb_xO_y$, $AlP_xO_y$, $MgO_x$, $LiNb_xO_y$, $BO_x$, $CeO_x$, $LiAl_xO_y$, $Sn(PO_4)_x$, $ZrO_x$, $MgAl_xO_y$, $SiO_x$, $NiO_x$, Pt, Pd, Ir, $Ru_xO_y$, $CeZr_xO_y$, $BiO_x$, $TiN_x$, ZnO, ZnS, $MnO_2$, $NbO_2$, $VS_2$, $TiS_2$, $CoS_2$, and $Al_2O_3$.

2. The engineered coating material of claim 1, wherein conductive carbon materials comprise carbon particles.

3. The engineered coating material of claim 2, wherein a surface area of the carbon particles is in the range of about 50 to about 3000 m²/g.

4. The engineered coating material of claim 1, wherein the coverage of the surface by the coating material on the surface of the conductive carbon material is in a range of 50% to 90%.

5. The engineered coating material of claim 1, wherein a thickness of the engineered coating material is in the range of about 0.5 to about 1.5 nm.

6. The engineered coating material of claim 1, wherein the engineered coating material comprises at least one of: artificially introduced vacancies, artificially introduced interstitials, or artificially introduced substitutional defects.

7. A method for forming an engineered coating material on a conductive carbon material the method comprising:
    forming a plurality of binding sites, wherein each binding site is configured to interface with at least one polysulfide;
    determining one or more materials to be used for the engineered coating material; and
    forming the engineered coating material with a partial coverage or full coverage on a conductive carbon surface,
    wherein the engineered coating material comprises at least one material selected from a group comprising: $AlO_x$, $TiO_x$, $SnO_x$, $ZnO_x$, $NbO_x$, $TiNb_xO_y$, $AlP_xO_y$, $MgO_x$, $LiNb_xO_y$, $BO_x$, $CeO_x$, $LiAl_xO_y$, $Sn(PO_4)_x$, $ZrO_x$, $MgAl_xO_y$, $SiO_x$, $NiO_x$, Pt, Pd, Ir, $Ru_xO_y$, $CeZr_xO_y$, $BiO_x$, $TiN_x$, ZnO, ZnS, $MnO_2$, $NbO_2$, $VS_2$, $TiS_2$, $CoS_2$, and $Al_2O_3$.

8. The method of claim 7, further comprising:
    analyzing one or characteristics of the engineered coating material.

9. The method of claim 7, wherein forming the engineered coating material comprises depositing the engineered coating material using at least one of: atomic layer deposition (ALD), physical vapor deposition (PVD), molecular layer deposition (MLD), chemical vapor deposition (CVD), low pressure chemical vapor deposition (LPCVD) vapor phase epitaxy (VPE), or atomic layer chemical vapor deposition (ALCVD).

10. The method of claim 7, wherein forming the engineered coating material comprises:
coating the conductive carbon surface by exposing the conductive carbon to one or more reactive precursors of the one or more coating materials.

11. The method of claim 7, wherein conductive carbon comprises carbon particles.

12. The method of claim 11, wherein a surface area of the carbon particles is in a range of 5-10,000 $m^2/g$.

13. The method of claim 7, wherein the partial coverage of the coating materials on the surface of the conductive carbon is in a range of 10% to 100%.

14. The method of claim 7, wherein a thickness of the engineered coating material is in a range of 0.1 to 10 nm.

15. The method of claim 7, wherein the engineered coating material comprises at least one of: artificially introduced vacancies, artificially introduced interstitials, or artificially introduced substitutional defects.

* * * * *